United States Patent Office 3,021,345
Patented Feb. 13, 1962

3,021,345
16α,17α-DIHYDROXYPREGNEN-20-ONES AND PROCESS FOR PREPARATION OF SAME
Sheila M. Waddington-Feather (neé Booker), Bernard Ellis, and Vladimir Petrow, all of London, England, assignors to The British Drug Houses Limited
No Drawing. Filed Sept. 19, 1960, Ser. No. 56,700
Claims priority, application Great Britain Sept. 24, 1959
5 Claims. (Cl. 260—397.4)

This invention is for improvements in or relating to the preparation of organic compounds and has particular reference to the preparation of 16α,17α-dihydroxypregnen-20-one derivatives of the Formula I below, where R is a hydrogen atom or a methyl group.

It is an object of the present invention to provide a novel process for the preparation of 16α,17α-dihydroxypregnen-20-ones of the Formula I below, where R is a hydrogen atom or a methyl group, which process is superior to known processes in that the yields of 16α,17α-dihydroxypregnen-20-ones obtained are considerably higher, the experimental operations involved are simpler, the quantities of solvents employed are minimal and hence the process is more economical, and serious difficulties are not encountered as the scale is increased.

It is a further object of this invention to provide the new steroidal derivative 6-methyl-3β-16α,17α-trihydroxy-pregn-5-en-20-one which is of value on account of its glucocorticoid and other biological properties and as an intermediate in the preparation of cyclic acetals and ketals with useful biological properties, e.g. progestational, anti-inflammatory and diuretic activity. Thus for example by condensation with acetone in the presence of perchloric acid the corresponding 16α,17α-acetonide may be prepared which passes into the corresponding 3-oxo-Δ⁴-6α-methyl derivative by an oxidation of the Oppenauer type. The latter compound is a potent anti-inflammatory steroid which differs from known anti-inflammatory steroids in being devoid of an 11-oxygenated function and it thus represents a new class of anti-inflammatory material which is active inter alia in dermatological conditions.

According to the present invention there is provided a process for the preparation of 3β,16α,17α-trihydroxypregn-5-en-20-ones having the general formula

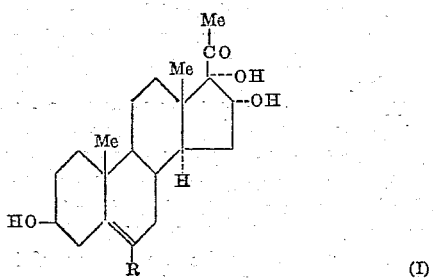

(I)

(where R is hydrogen or a methyl group) which process comprises reacting a 16α,17α-epoxypregnen-20-one having the general formula

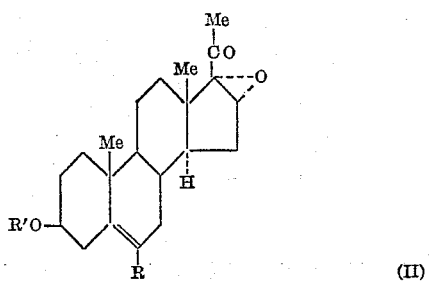

(II)

(where R has the same meaning as above and R' is hydrogen or an aliphatic acyl radical containing from 1 to 8 carbon atoms) with an alkoxy carbonyl hydrazine and a lower alkanoic acid containing up to 3 carbon atoms to give the corresponding alkoxy carbonyl hydrazone of a 16α-alkanoyloxy-17α-hydroxypregnen-20-one, saponifying the alkoxy carbonyl hydrazone to give a 16α,17α-dihydroxy derivative and hydrolysing the foregoing 16α,17α-dihydroxy derivative to the required 3β,16α,17α-trihydroxypregn-5-en-20-one.

It is believed that the above-mentioned alkoxy carbonyl hydrazone of a 16α-alkanoyloxy-17α-hydroxypregnen-20-one has the formula

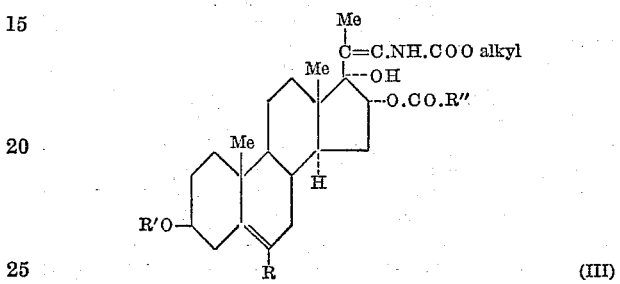

(III)

(where R and R' have the same meaning as above and R'' is the alkyl group derived from the lower alkanoic acid containing up to 3 carbon atoms).

It is also believed that the above-mentioned 16α,17α-dihydroxy derivative has the formula

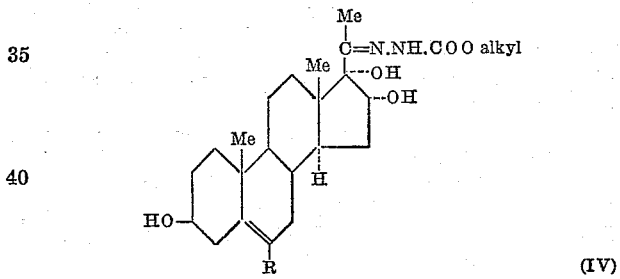

(IV)

(where R has the same meaning as above).

In carrying the process of the invention into effect, it has been found that conversion of a 3β-acyloxy- or 3β-hydroxy-16α,17α-epoxypregn-5-en-20-one (II) into the corresponding alkoxycarbonylhydrazone of a 16α-alkanoyloxy-17α-hydroxypregn-5-en-20-one (III) is conveniently achieved by treating a solution of the Compound II in a lower alkanoic acid, such as acetic acid, with an excess (preferably not less than 3 moles) of an alkoxycarbonylhydrazine, such as ethoxycarbonylhydrazine, and stirring the mixture at room temperature until reaction is complete. Thereafter the mixture is poured into water and the precipitated product collected, washed and dried. The material so obtained is sufficiently pure for use in the next stage, but may be purified by recrystallisation if desired.

Saponification may be accomplished by heating the foregoing product with ethanolic or methanolic sodium or potassium hydroxide, the 16α,17α-dihydroxy derivative (IV) being obtained after acidification with, for example, acetic acid and dilution of the mixture with water. The material obtained in this way is sufficiently pure for use in the next stage, but may be purified if desired. Conversion of the 16α,17α-dihydroxy derivative (IV) into Compound I may be achieved by treating Compound IV with a mixture of aqueous acetic acid and not less than 1.2 molar proportions of pyruvic acid at temperatures ranging from room temperature to the boiling point of the mixture. Preferably, the mixture is heated at 100° C. for times ranging from 10 to 30 minutes, after which water may be added until separation of the required Compound I is complete. Thereafter the product is collected and purified. Other methods of hydrolysis will be apparent to those skilled in the art.

Following is a description by way of example of methods of carrying the invention into effect:

EXAMPLE 1

*3β,16α,17α-trihydroxypregn-5-en-20-one (I; R=H)*

(a) Ethoxycarbonyl hydrazine (238.5 g.) was added to a solution of 3β-hydroxy-16α,17α-epoxypregn-5-en-20-one (238.5 g.) in acetic acid (2 l.) and the mixture stirred at room temperature for 18 hours. A marked increase of viscosity occurred after the first 4 hours of stirring. This was followed by a decrease in viscosity during the next 2 hours and the separation of a fine granular solid. The mixture was poured slowly with stirring into a solution of sodium chloride (350 g.) in water (10 l.) at 0° C., and the precipitated solids collected, washed with water and pressed dry.

A solution of the foregoing product in methanol (2.3 l.) containing potassium hydroxide (37.5 g.) was heated under reflux for 20 minutes. The mixture was then treated with acetic acid (50 ml.) and poured into cold water (12. l.). The product was collected, washed and pressed dry.

A stirred solution of the foregoing material in acetic acid (1240 ml.) at 100° C. was treated with pyruvic acid (94. ml.). Ten minutes later, water (800 ml.) was added over a period of 5 to 10 minutes, and the heating and stirring continued for a further 20 minutes. The mixture was then cooled to room temperature and the product collected by filtration, washed with water and dried to give 3β,16α,17α-trihydroxypregn-5-en-20-one, M.P. 240 to 245° C., not depressed in admixture with an authentic specimen.

(b) 3β - acetoxy-16α,17α-epoxypregn-5-en-20-one was reacted with ethoxycarbonyl hydrazine in acetic acid and the product processed exactly as described in Example 1(a). There was obtained 3β,16α,17α-trihydroxypregn-5-en-20-one, M.P. 242 to 247° C., identical in every respect with an authentic specimen.

EXAMPLE 2

*6-methyl-3β,16α,17α-trihydroxypregn-5-en-20-one (I, R=Me)*

A solution of 3β-hydroxy - 16α,17α - epoxy-6-methylpregn-5-20-one (45.6 g.) in acetic acid (400 ml.) was treated with ethoxycarbonylhydrazine (45.6 g.) and the mixture stirred at room temperature for 8 hours. After being set aside overnight, the mixture was poured into a solution of sodium chloride (450 g.) in water (2.7 l.), and the precipitated solids collected, washed, and dried at 100° C. to give material with M.P. 220 to 240° C. Purification from aqueous methanol gave needles, M.P. 250 to 252° C. (decomp.), $[\alpha]_D^{29}$ —128° (c, 0.93 in chloroform).

The foregoing compound (57 g.) in ethanol (400 ml.) containing sodium hydroxide (7 g.) was heated under reflux for 30 minutes. The mixture was then treated with acetic acid (12 ml.) and poured into cold water. The product was collected, washed with water and dried. Crystallisation from aqueous ethanol gave small plates, M.P. 224 to 229° C. (decomp.).

A mixture of the foregoing product (23.5 g.), acetic acid (400 ml.), pyruvic acid (12 ml.) and water (12 ml.) was heated at 100° C. for 25 minutes. Thereafter, water was added dropwise until a crystalline solid separated. After cooling to room temperature, the product was collected, washed and purified from aqueous ethanol to give 6-methyl-3β,16α,17α-trihydroxypregn-5-en-20-one in flat needles, M.P. 213 to 215° C., $[\alpha]_D^{28}$ —65° (c, 1.0 in chloroform containing a trace of pyridine).

We claim:

1. A process for the preparation of 3β,16α,17α-trihydroxypregn-5-en-20-ones having the general formula

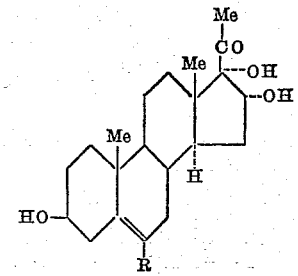

where R is selected from the class consisting of hydrogen and a methyl group, which process comprises reacting a 16α,17α-epoxypregnen-20-one having the general formula

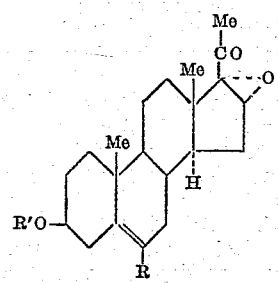

where R has the same meaning as above and R' is selected from the class consisting of hydrogen and an aliphatic acyl radical containing from 1 to 8 carbon atoms, with an alkoxy carbonyl hydrazine and a lower alkanoic acid containing up to 3 carbon atoms to give the corresponding alkoxy carbonyl hydrazone of a 16α-alkanoyloxy-17α-hydroxypregnen-20-one, saponifying the alkoxy carbonyl hydrazone to give a 16α,17α-dihydroxy derivative and hydrolysing the foregoing 16α,17α-dihydroxy derivative by treatment with a mixture of acetic acid and not less than 1.2 molar proportions of pyruvic acid to the required 3β,16α,17α-trihydroxypregn-5-en-20-one.

2. A process as claimed in claim 1 wherein a solution of the 16α,17α-epoxypregnen-20-one in a lower alkanoic acid is treated with an excess of the alkoxycarbonylhydrazine.

3. A process as claimed in claim 2 wherein a solution of the 16α,17α-epoxypregnen-20-one in acetic acid is treated with at least 3 moles of ethoxycarbonylhydrazine.

4. A process as claimed in claim 1 wherein the saponification is effected by heating with ethanolic or methanolic sodium or potassium hydroxide.

5. A process for the preparation of 3β,16α,17α-trihydroxy-pregn-5-en-20-ones having the general formula:

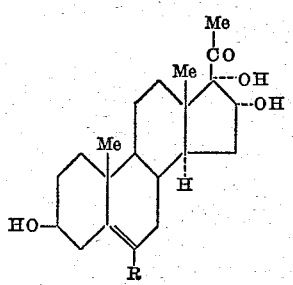

where R is selected from the group consisting of hydrogen and methyl, which process comprises saponifying an alkoxy carbonyl hydrazone having the formula:

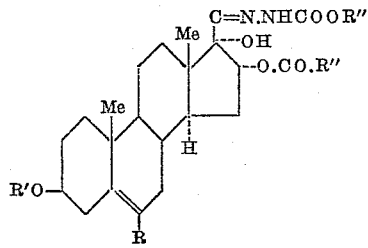

where R has the same meaning as above, R' is selected from the group consisting of hydrogen and an aliphatic acyl radical containing from 1 to 8 carbon atoms and R" is an alkyl group containing up to 3 carbon atoms, to give a 16α,17α-dihydroxy derivative and hydrolyzing the foregoing 16α,17α-dihydroxy derivative by treatment with a mixture of acetic acid and not less than 1.2 molar proportions of pyruvic acid to the required 3β,16α,17α-trihydroxy-pregn-5-en-20-one.

References Cited in the file of this patent
UNITED STATES PATENTS 2,808,399    Dodson _____ Oct. 1, 1957
2,894,961    Dodson _____ July 14, 1959